United States Patent
Deshpande et al.

(10) Patent No.: US 10,963,400 B2
(45) Date of Patent: Mar. 30, 2021

(54) SMART CONTRACT CREATION AND MONITORING FOR EVENT IDENTIFICATION IN A BLOCKCHAIN

(71) Applicant: International Business Machines Corporation, Armonk, NY (US)

(72) Inventors: Pralhad D. Deshpande, Singapore (SG); Raghav Sood, Singapore (SG)

(73) Assignee: International Business Machines Corporation, Armonk, NY (US)

(*) Notice: Subject to any disclaimer, the term of this patent is extended or adjusted under 35 U.S.C. 154(b) by 160 days.

(21) Appl. No.: 15/730,209

(22) Filed: Oct. 11, 2017

(65) Prior Publication Data

US 2019/0108140 A1 Apr. 11, 2019

(51) Int. Cl.
| | |
|---|---|
| *H04L 9/32* | (2006.01) |
| *G06F 12/14* | (2006.01) |
| *G06F 21/10* | (2013.01) |
| *G06F 21/62* | (2013.01) |
| *G06Q 20/38* | (2012.01) |
| *H04L 29/06* | (2006.01) |
| *G06Q 10/10* | (2012.01) |

(52) U.S. Cl.
CPC .......... *G06F 12/1408* (2013.01); *G06F 21/10* (2013.01); *G06F 21/62* (2013.01); *G06Q 10/10* (2013.01); *G06Q 20/3829* (2013.01); *H04L 9/3239* (2013.01); *H04L 63/0442* (2013.01); *G06F 2212/1052* (2013.01); *H04L 2209/38* (2013.01); *H04L 2209/603* (2013.01)

(58) Field of Classification Search
CPC ........... H04L 63/0442; H04L 2209/603; G06F 12/1408; G06F 21/62; G06F 21/10; G06F 2212/1052; G06Q 20/3829

USPC .......................................................... 713/176
See application file for complete search history.

(56) References Cited

U.S. PATENT DOCUMENTS

| | | | |
|---|---|---|---|
| 2002/0103660 A1* | 8/2002 | Cramon | G06Q 30/06 709/220 |
| 2017/0048235 A1 | 2/2017 | Lohe et al. | |
| 2017/0103468 A1 | 4/2017 | Orsini et al. | |
| 2017/0116693 A1 | 4/2017 | Rae et al. | |
| 2017/0132626 A1 | 5/2017 | Kennedy | |
| 2017/0353309 A1* | 12/2017 | Gray | G06F 21/53 |
| 2018/0054491 A1* | 2/2018 | Mankovskii | H04L 67/142 |

(Continued)

FOREIGN PATENT DOCUMENTS

| | | |
|---|---|---|
| WO | 2017090041 A1 | 6/2017 |
| WO | 2017098519 A1 | 6/2017 |

OTHER PUBLICATIONS

"Konstantinos Christidis and Michael Devetsikiotis, Blockchains and Smart Contracts for the internet of Things, 2016, IEEE, vol. 4, pp. 2292-22303" (Year: 2016).*

(Continued)

*Primary Examiner* — Trong H Nguyen
*Assistant Examiner* — Kevin Ayala (57) ABSTRACT

An example operation may include one or more of identifying a smart contract, processing the smart contract to create a smart contract definition, determining whether the smart contract has been accepted by identified parties, when the smart contract has been accepted by the identified parties, generating a smart contract definition hash, and forwarding the smart contract definition hash to one or more blockchains.

14 Claims, 11 Drawing Sheets

(56) References Cited

U.S. PATENT DOCUMENTS

| | | | | |
|---|---|---|---|---|
| 2018/0089761 A1* | 3/2018 | Stradling | ............ | G06F 12/1408 |
| 2018/0096175 A1* | 4/2018 | Schmeling | .............. | B29C 64/10 |
| 2018/0227116 A1* | 8/2018 | Chapman | .............. | H04L 9/0643 |
| 2019/0050856 A1* | 2/2019 | Vintila | ............... | G06Q 20/3829 |
| 2019/0057382 A1* | 2/2019 | Wright | ................ | G06Q 20/389 |

OTHER PUBLICATIONS

V. Buterin, A Next Generation Smart Contract & Decentralized Application Platform, Ethereum White Paper. Retrieved from Internet using: https://www.weusecoins.com/assets/pdf/library/Ethereum_white_paper-a_next_generation_smartcontract_and_decentralized_application_plafform-vitalik-buterin.pdf.

A. Kosba, A. Miller, E. Shi, Z. Wen, and C. Papamanthou, Hawk: The Blockchain Model of Cryptography and Privacy-Preserving Smart Contracts, 2016 IEEE Symposium on Security and PrivacyRetrieved from inernet using: http://download.xuebalib.com/xuebalib.com.27267.pdf.

K. Christidis, and M. Devetsikiotis, Blockchains and Smart Contracts for the Internet of Things, IEEE Access, May 10, 2016, pp. 2292-2303. Retrieved from Internet using: http://ieeexploreieee.org/stamp/stamp.jsp?arnumber=7467408.

* cited by examiner

LOAN CONTRACT
310

ON THIS DAY, PARTY A AND PARTY B HEREBY AGREE TO CONTRACT DEAL TO LOAN MONIES IN THE SUM OF XYZ FOR A PERIOD OF TIME EQUAL TO X MONTHS WITH AN INTEREST RATE OF 123 AND MONTHLY PAYMENTS....

LOAN STATE MACHINE
320

|  | STATE1 | STATE2 | STATE3 |
|---|---|---|---|
| STATE1 |  | W | Z |
| STATE2 | W |  | X Y |
| STATE3 | Z | X Y |  |

TRANSITION MATRIX
330

| W | INITIATE |
|---|---|
| X | SIGNED |
| Y | PAYMENT MADE |
| Z | TERMINATED |

CONTRACT ALPHABET
340

SMART CONTRACT CREATION AND MONITORING FOR EVENT IDENTIFICATION IN A BLOCKCHAIN

TECHNICAL FIELD

This application generally relates to creating and monitoring smart contracts, and more particularly, smart contract creation and monitoring for event identification in a blockchain.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary.

Current blockchain systems rely on massively replicated execution of smart contract code, which is wasteful and unnecessary. Massively replicated execution leads to loss of privacy because execution has to happen on decrypted data. Preserving privacy and not executing unnecessary code may provide for increased optimization when processing smart contracts in a blockchain.

SUMMARY

One example embodiment may provide a method that includes one or more of identifying a smart contract, processing the smart contract to create a smart contract definition, determining whether the smart contract has been accepted by identified parties, when the smart contract has been accepted by the identified parties, generating a smart contract definition hash, and forwarding the smart contract definition hash to one or more blockchains.

Another example embodiment may provide an apparatus that includes a processor configured to perform one or more of identify a smart contract, process the smart contract to create a smart contract definition, determine whether the smart contract has been accepted by identified parties, when the smart contract has been accepted by the identified parties, generate a smart contract definition hash, and forward the smart contract definition hash to one or more blockchains.

Yet another example embodiment may provide a non-transitory computer readable storage medium including instructions that when executed cause a processor to perform one or more of identifying a smart contract, processing the smart contract to create a smart contract definition, determining whether the smart contract has been accepted by identified parties, when the smart contract has been accepted by the identified parties, generating a smart contract definition hash, and forwarding the smart contract definition hash to one or more blockchains.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to creating and monitoring smart contracts on one or more blockchains, and in another embodiment relates to using a smart contract processing engine to identify relevant event data for smart contract creation and monitoring of event identification in a blockchain.

According to example embodiment, smart contracts created and stored in a blockchain(s) may be modeled as passive deterministic finite automations (DFAs), which are setup for processing and monitoring via state chart XML (SCXML) which changes states in response to items read from the blockchain and/or based on messages in private communication. The smart contracts may be executed inside a smart contract processing engine, e.g., an apache commons SCXML engine. When establishing the smart contract information, a contract alphabet may be defined for each smart contract, which may include various variables W, X, Y, Z, etc., defined to represent events, such as initiated, signed, payment made, terminated, modified or other contract related events specified for a particular smart contract.

The smart contract processing engine may read new blocks on blockchains and apply events which are monitored on the active smart contracts. Smart contract processing engines can read multiple information sources concurrently to identify relevant information, which can be considered an 'event' and which may be updated to the relevant parties and the smart contracts as well.

Figure 1:
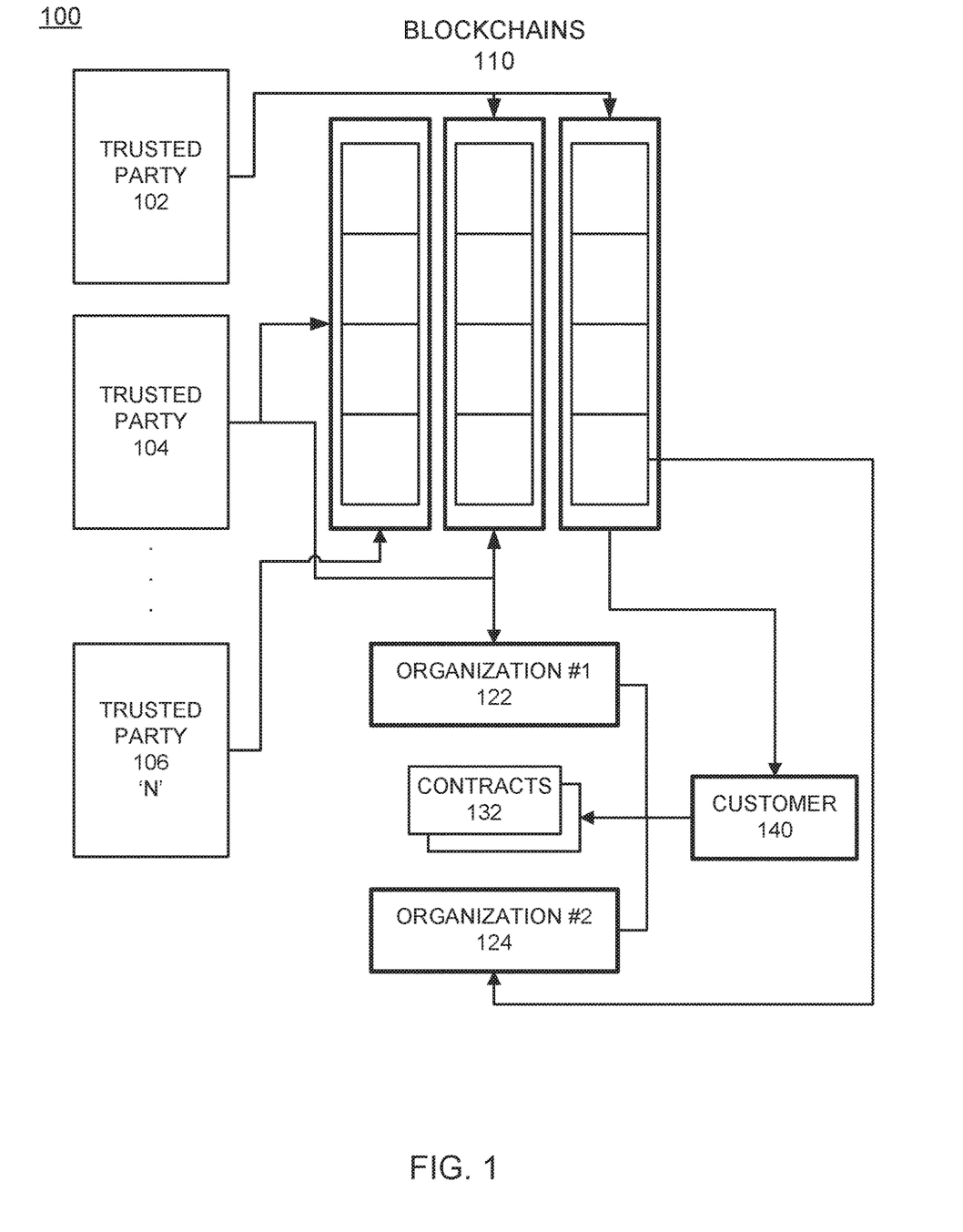
FIG. 1 illustrates a logic diagram of organizations and customers accessing blockchains for contract information, according to example embodiments.

FIG. 1 illustrates a logic diagram of processing blockchain data and updating certain parties, according to example embodiments. Referring to FIG. 1, the configuration 100 provides various blockchain trusted parties 102, 104, 106, which may be members of various blockchains 110, and which have the privilege to submit transactions for commitment to the blockchains 110. The blockchains 110 may have smart contract event data included in new blocks which may be identified during a monitoring operation as performed by one or more organizations 122/124 as parties to smart contracts 132 with one or more customers 140, which are identified by relevant events. One example may be a public event, such as bankruptcy, government filings (e.g., tax collection, foreclosure, asset sales, etc.), which could affect any organization currently engaged in a smart contract with that particular customer 140. The smart contracts may be identified as passive DFAs conducted between organization #1 122 or organization #2 124 and the customer 140. If an event, such as bankruptcy is published, a state change may occur once the information is identified assuming a policy is satisfied, which is required by the smart contract processing engine.

Figure 2:
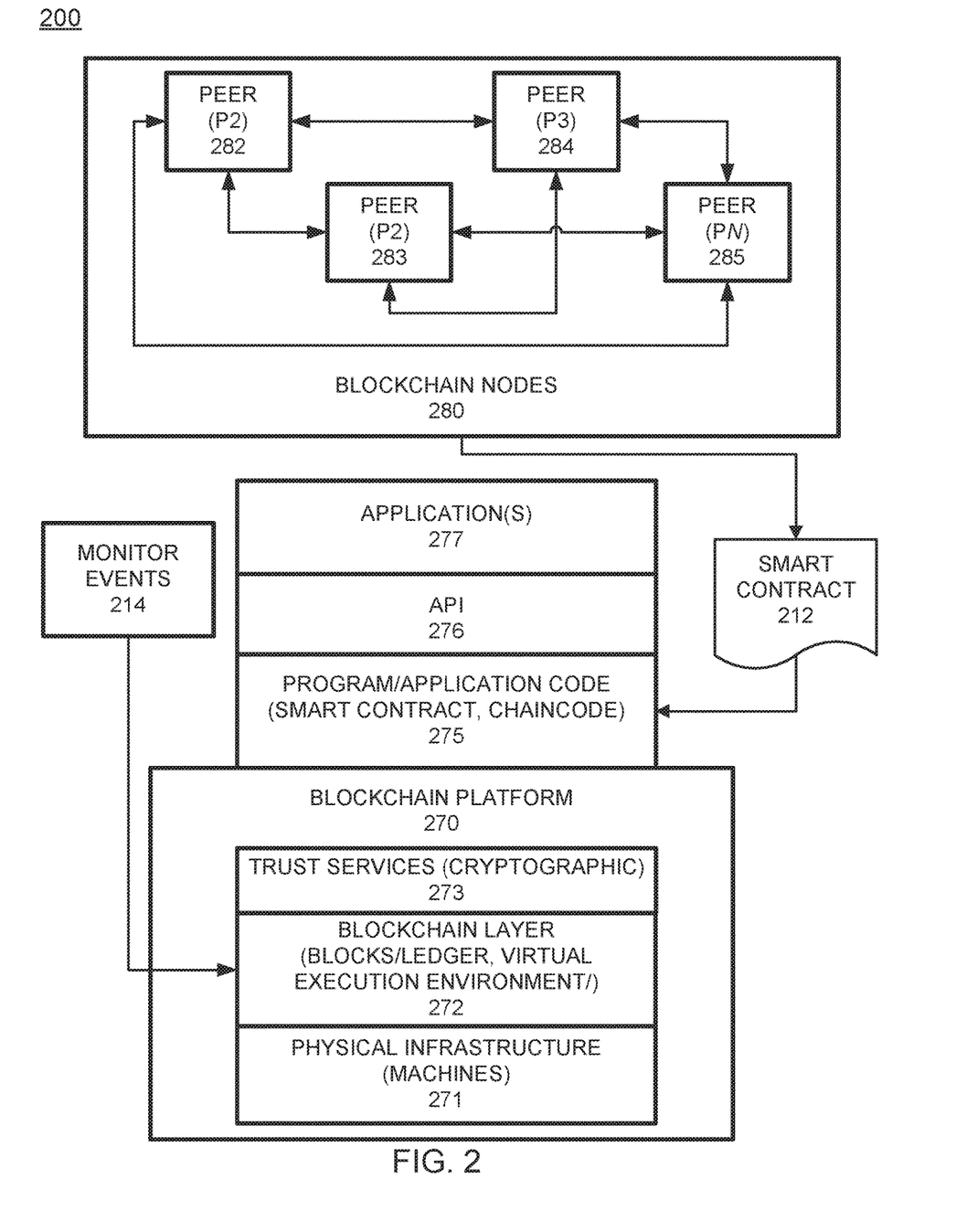
FIG. 2 illustrates an example blockchain configuration for performing blockchain smart contract creating and monitoring operations, according to example embodiments.

FIG. 2 illustrates an example blockchain configuration for performing smart contract creation and monitoring operations, according to example embodiments. Referring to FIG. 2, the blockchain system 200 may include certain common blockchain elements, such as a group of blockchain nodes 280, which may be assigned peer blockchain nodes 'peer nodes' 282-285, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2 may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, a smart contract may be identified and approved by the peer nodes 280. The nodes may reach consensus and permit the smart contract to be enacted as a transaction to be committed to the blockchain ledger 272 provided that certain conditions are satisfied. For example, the smart contract may require a series of initialization operations to be approved by the consensus peers. In this case, the peers may identify the smart contract 212 has been signed by all necessary parties prior to being enacted on the blockchain. Thereafter, certain monitor events 214 may be created to monitor the blockchain 272 for events relevant to the smart contracts.

Figure 3:
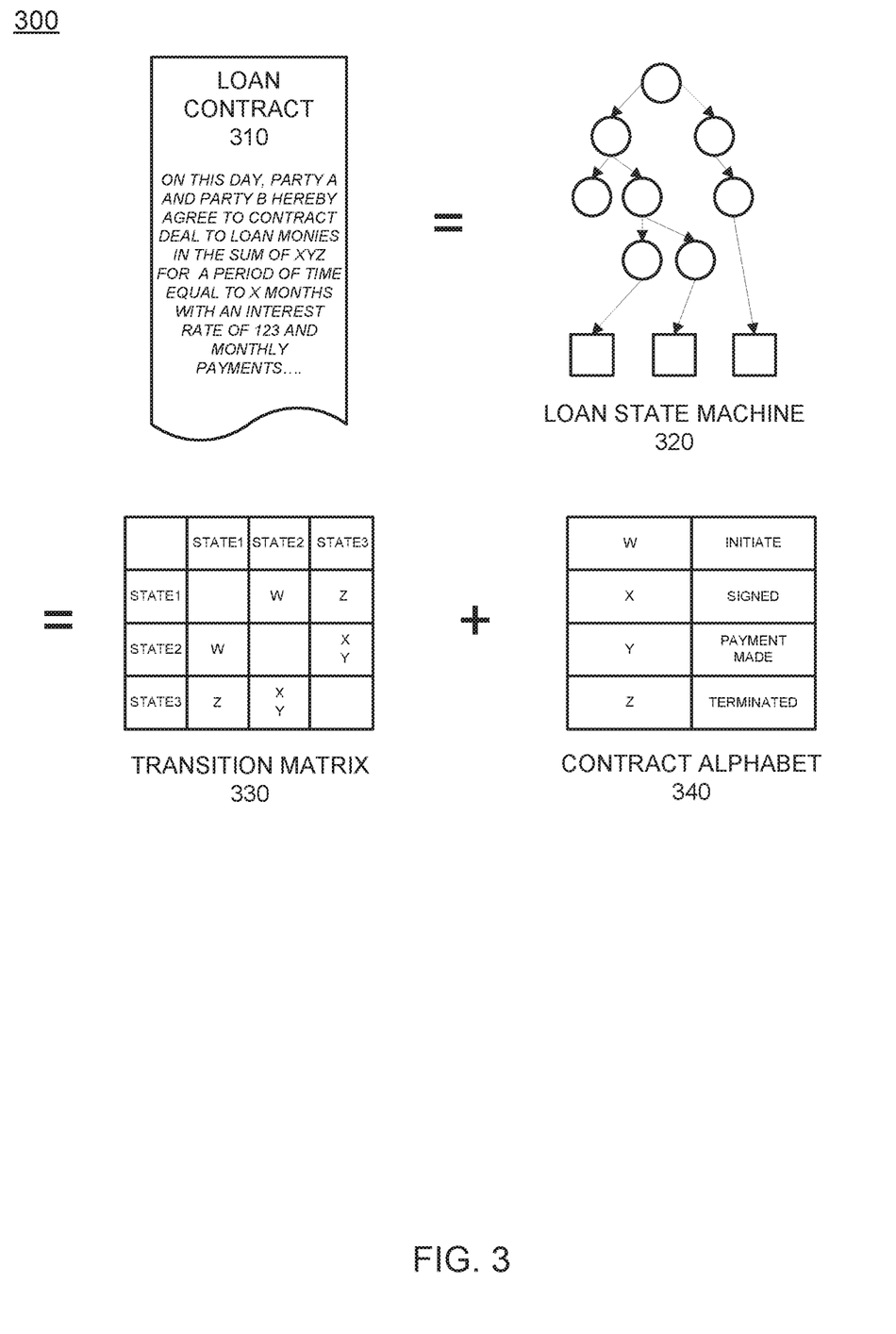
FIG. 3 illustrates a contract progression diagram of creating a contract definition for blockchain compatibility, according to example embodiments.

FIG. 3 illustrates a contract progression diagram of creating a contract definition for blockchain compatibility, according to example embodiments. Referring to FIG. 3, the configuration 300 provides an example of a loan contract 310 being read and processed to create a smart contract. For example, when the loan contract 310 details are identified word-by-word, the resulting state machine 320 may identify terms, phrases, etc., to identify the important elements of the written contract which can then be used to create the alphabet 340 and the transition matrix 330. The state machine 320 may be a series of events/variables/conditions derived from the content of the contract 310. The state transition matrix 330 may be used to identify the various states and the corresponding events for each state of the contract. The alphabet 340 may define the actual events according to their alphabet identifiers, and together with the transition matrix, may define the contract logically based on how it was written. The transition matrix and alphabet may be the basis of the smart contract definition.

Figure 4:
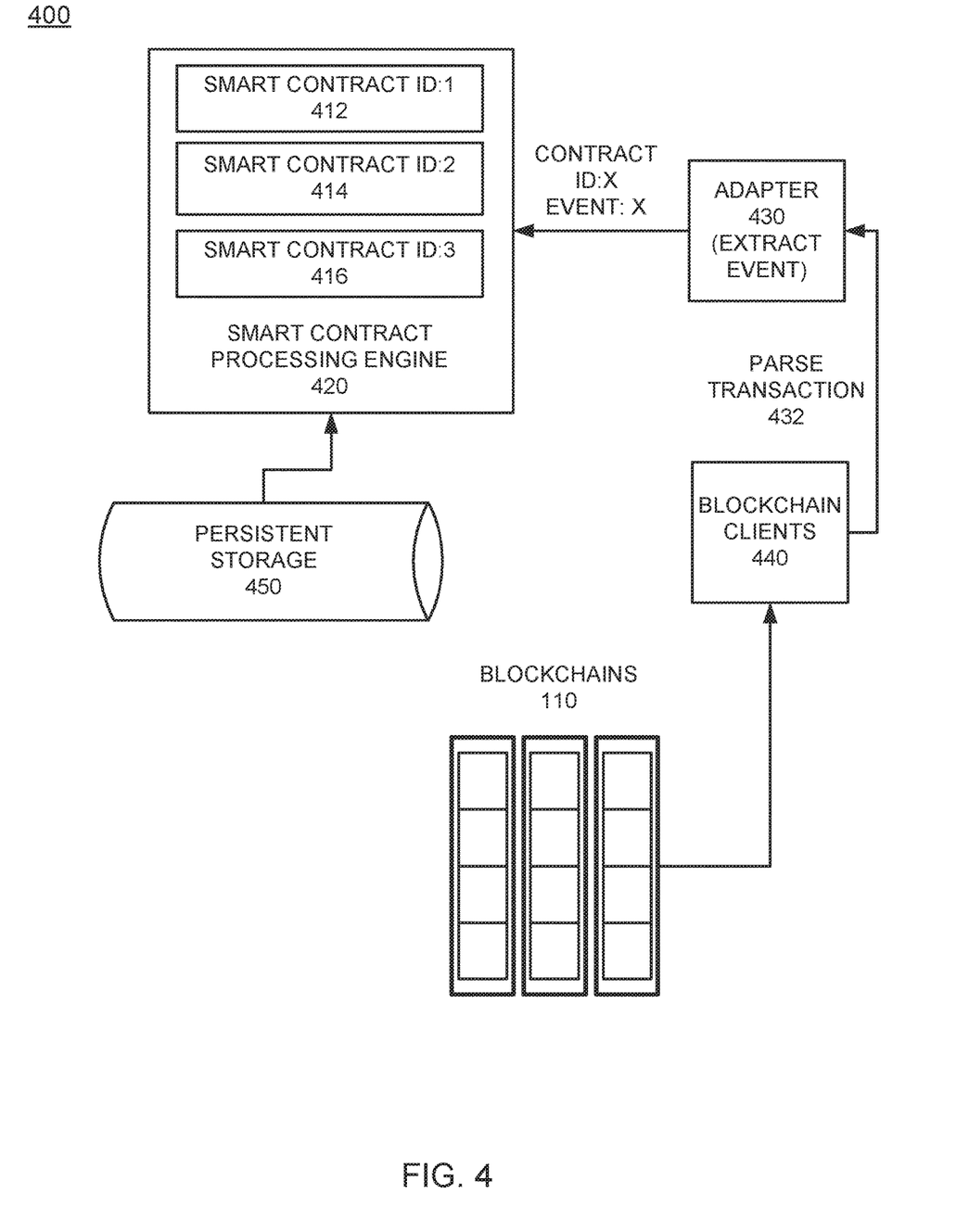
FIG. 4 illustrates a smart contract processing engine performing event monitoring on smart contract related information, according to example embodiments.

FIG. 4 illustrates a smart contract processing engine performing event monitoring on smart contract related information, according to example embodiments. Referring to FIG. 4, the configuration 400 includes a smart contract processing engine 420 which receives updated information originating from one or more blockchains 110 and which is provided to certain blockchain clients 440, which may be auditing or monitoring events from blockchain blocks on particular blockchains for certain events. The message data or transactions may be parsed 432 and an adapter module 430 may extract the event data as it pertains to certain smart contracts and events. The information extracted, such as a smart contract identifier of relevant smart contracts and one or more events may be organized and provided to the smart contract processing engine 420, which updates the particular smart contract (i.e., 412-416) and stores the updated information in a persistent storage source 450.

Figure 5A:
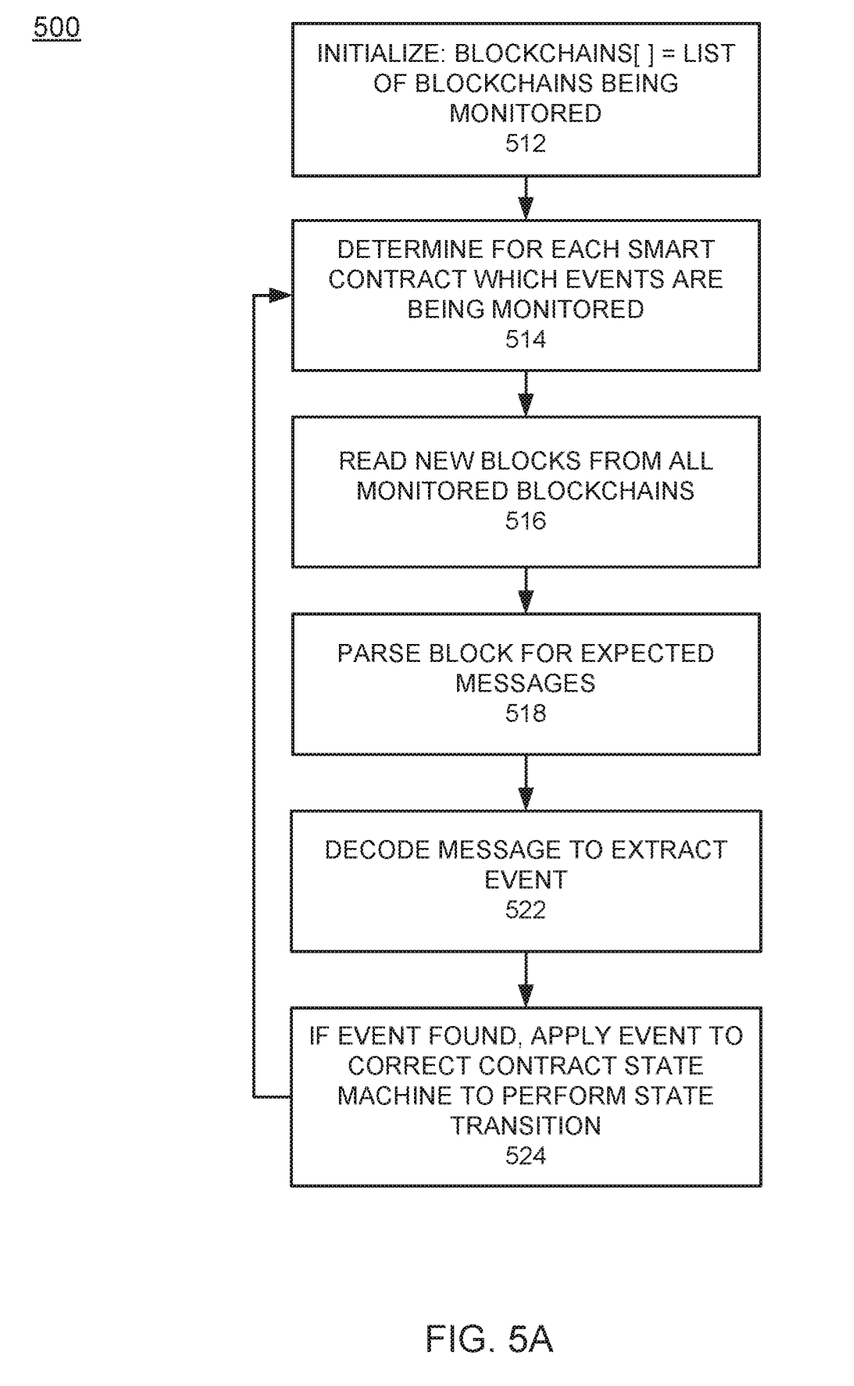
FIG. 5A illustrates an example flow diagram of executing a smart contract state transition, according to example embodiments.

FIG. 5A illustrates an example flow diagram of executing a smart contract state transition, according to example embodiments. Referring to FIG. 5A, the method 500 provides initializing the list of blockchains to be monitored for events 512. The smart contract events are then identified for monitoring purposes for each smart contract 514, the new blocks from all monitored blockchains 516 may be examined by the processing engine 420 and adapter module 430 to identify the content of the blocks. The blocks are parsed and the expected messages are extracted 518 and the message may be decoded to extract the event 522, and when the event is found the event may be applied to a correct contract state machine to perform the transition to an updated contract state 524.

Figure 5B:
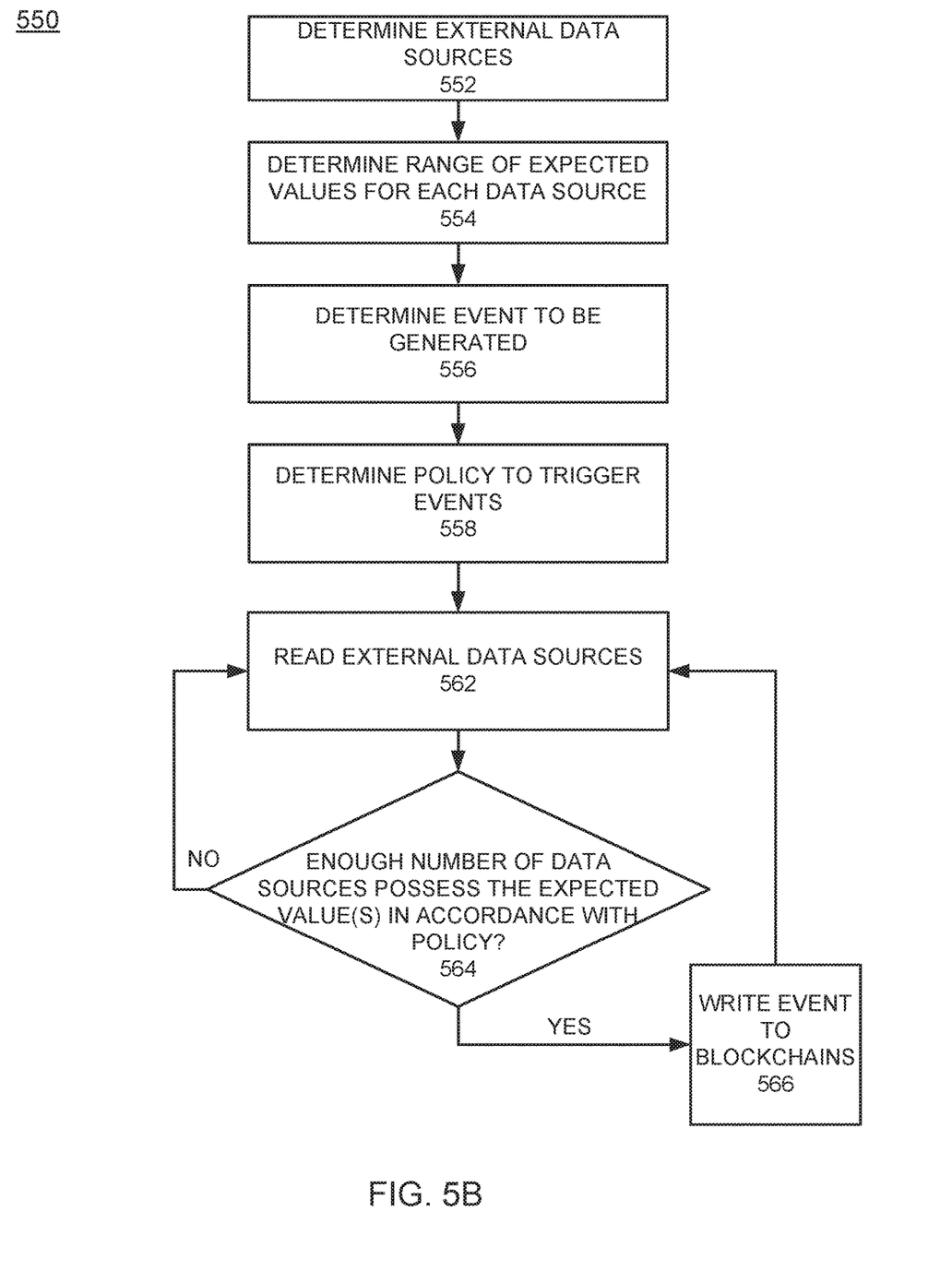
FIG. 5B illustrates an example flow diagram of generating messages to be recorded on a blockchain, according to example embodiments.

FIG. 5B illustrates an example flow diagram 550 of generating messages to be recorded on a blockchain, according to example embodiments. Referring to FIG. 5B, the initialization procedure may include determining external data sources 552 to identify relevant data which may affect smart contracts in the blockchains. The sources may be preapproved or trusted sources as opposed to arbitrary sources identifiable from known databanks or the Internet. Based on the smart contract events of interest, a range of expected values may be set for monitoring on the trusted sources 554. One or more events may be generated from the identified data 556. Policies may be required 558 to be fulfilled in order for the event to be valid. For example, depending on the blockchain requirements or the smart contract requirements, the policy may not permit the event to be valid unless the event occurs in two or more trusted source sites. One source of information may not be adequate and the policy may dictate that the event is not logged as a valid event until the number of required sources are confirmed for the event data. The external data sources may then be reviewed for relevant event data 562. When the policy requirements are fulfilled 564, the event may be written to the blockchains 566 related to the relevant smart contracts. Otherwise, the reading process continues in subsequent monitoring operations.

Figure 5C:
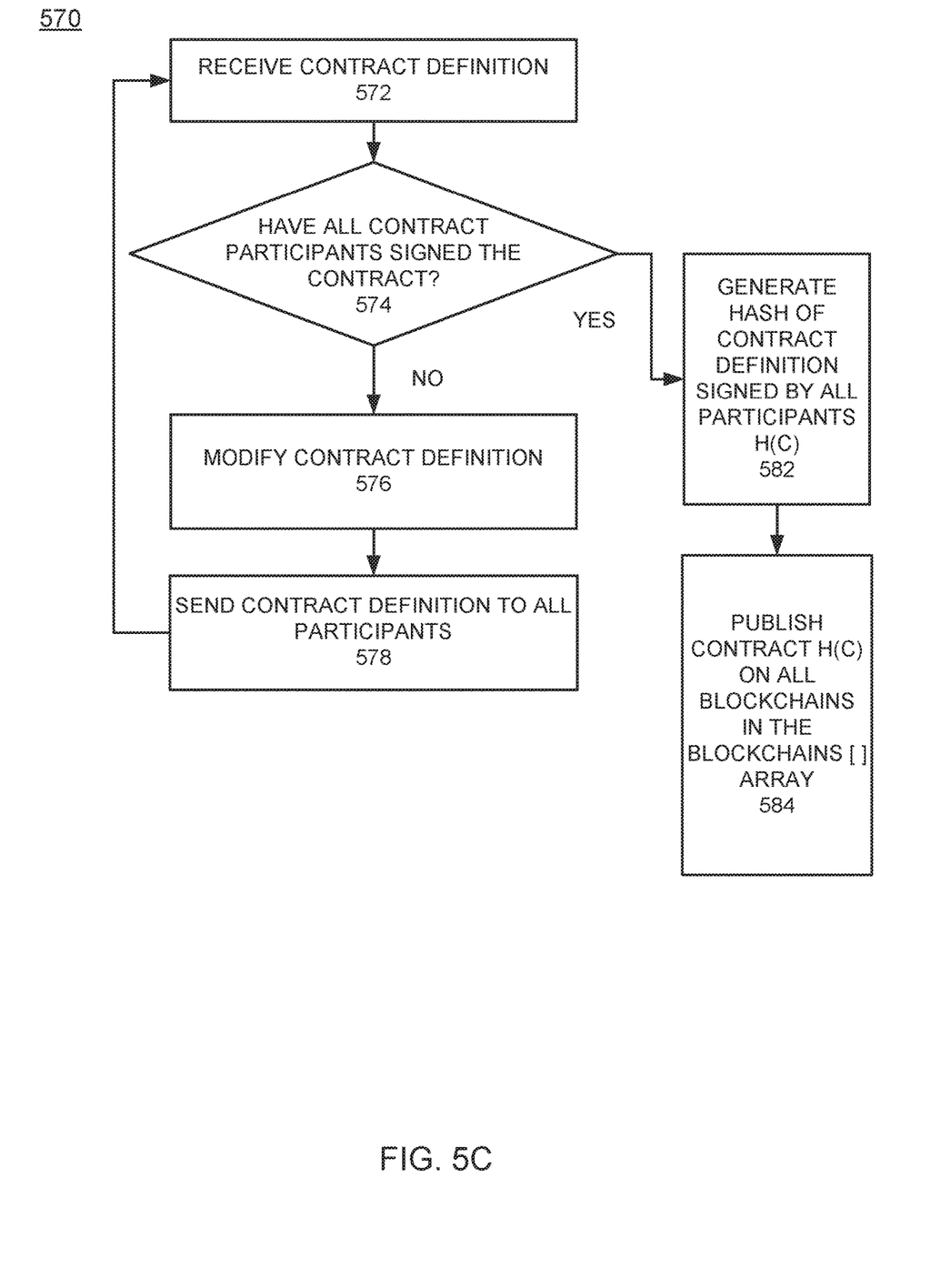
FIG. 5C illustrates an example flow diagram of initializing a smart contract, according to example embodiments.

FIG. 5C illustrates an example flow diagram of initializing a smart contract, according to example embodiments. Referring to FIG. 5C, the process 570 provides for establishing a smart contract and corresponding smart contract definition. The process may begin with receiving a smart contract definition 572 based on one or more smart contracts and determining whether the smart contract is validly executed by all interested parties 574. If so, the hash of the contract definition may be generated 582 and published on all relevant blockchains in the array of known blockchains 584. If not, the contract definition may be modified 576 to accommodate any necessary changes and then sent to all participants in an attempt to have the contract signed and executed 578.

Figure 6:
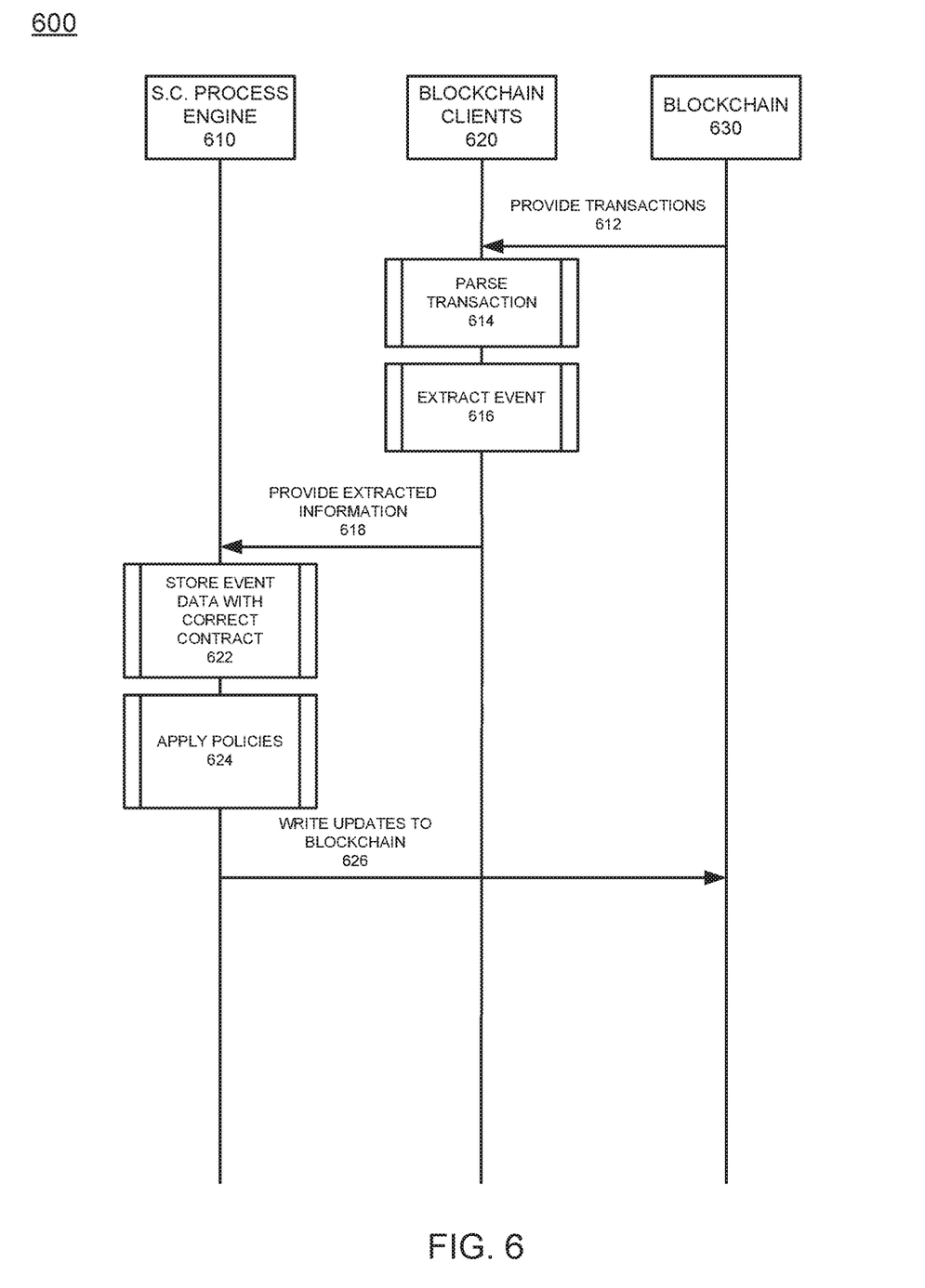
FIG. 6 illustrates an example system configuration diagram of identifying event data and updating smart contracts in a blockchain(s), according to example embodiment.

FIG. 6 illustrates an example system configuration diagram of identifying event data and updating smart contracts in a blockchain(s), according to example embodiment. Referring to FIG. 6, the system 600 may include a smart contract processing engine 610, blockchain clients 620 and a blockchain 630. In operation, the transactions from the blockchain may be received 612 and processed to parse 614 the content of the newer blocks for relevant event data to be extracted 616. The event information may be provided to the processing engine 618 to be applied to the correct contract 622 assuming the correct policies are applied 624 and are valid. Any updates may be stored in the blockchains 626.

Figure 7A:
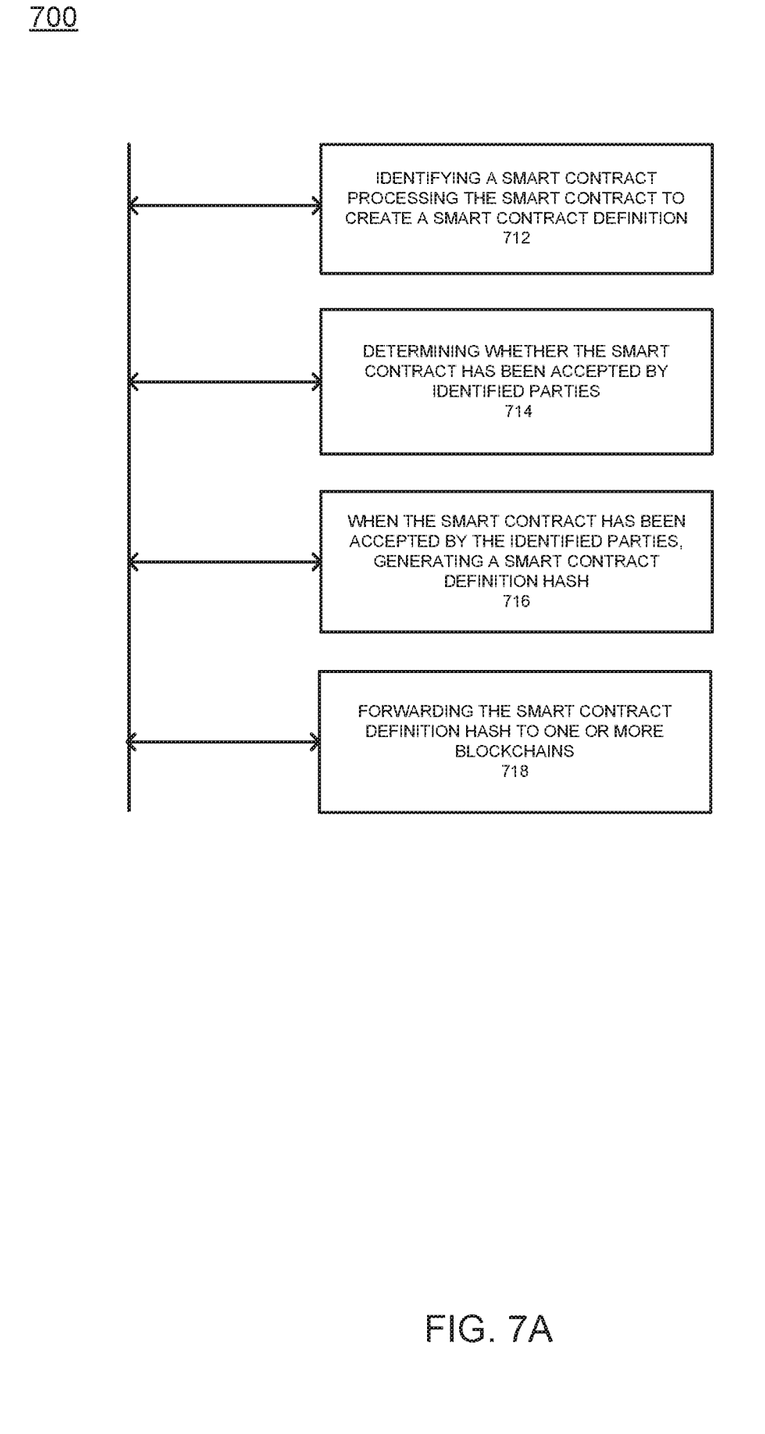
FIG. 7A illustrates a flow diagram of an example method of creating and writing smart contracts to a blockchain, according to example embodiments.

FIG. 7A illustrates a flow diagram of an example method of creating and writing smart contracts to a blockchain, according to example embodiments. Referring to FIG. 7A, the method 700 may include identifying a smart contract, and processing the smart contract to create a smart contract definition 712, determining whether the smart contract has been accepted by identified parties 714, and when the smart contract has been accepted by the identified parties, generating a smart contract definition hash 716, and forwarding the smart contract definition hash to one or more blockchains 718. The method may also include generating the hash of the smart contract definition by identifying terms of the smart contract, parsing the terms from the smart contract, creating a transition matrix and a contract alphabet from the parsed terms of the smart contract, and performing a hash of the transition matrix and the contract alphabet. The extracting of the contract alphabet may include parsing events from smart contract textual information and storing the events in the transition matrix. The method may include identifying the one or more blockchains to be monitored for updated events, identifying, from the smart contract, one or more events to monitor on the one or more blockchains, and reading a new block on the one or more blockchains, identifying the updated events from the new block, and applying the updated events to execute a state transition of the transition matrix. The method may also include identifying one or more parties required to be notified of the updated events, and transmitting a notification of the updated events to the one or more parties. The method may also include identifying one or more external data sources to monitor and determining a policy to use when monitoring the one or more events, determining which of the one or more blockchains to write the updated events, and when the policy has been satisfied, writing the updated events to the one or more blockchains. In one example, the policy requires a minimum number of external data sources to confirm the updated events.

Figure 7B:
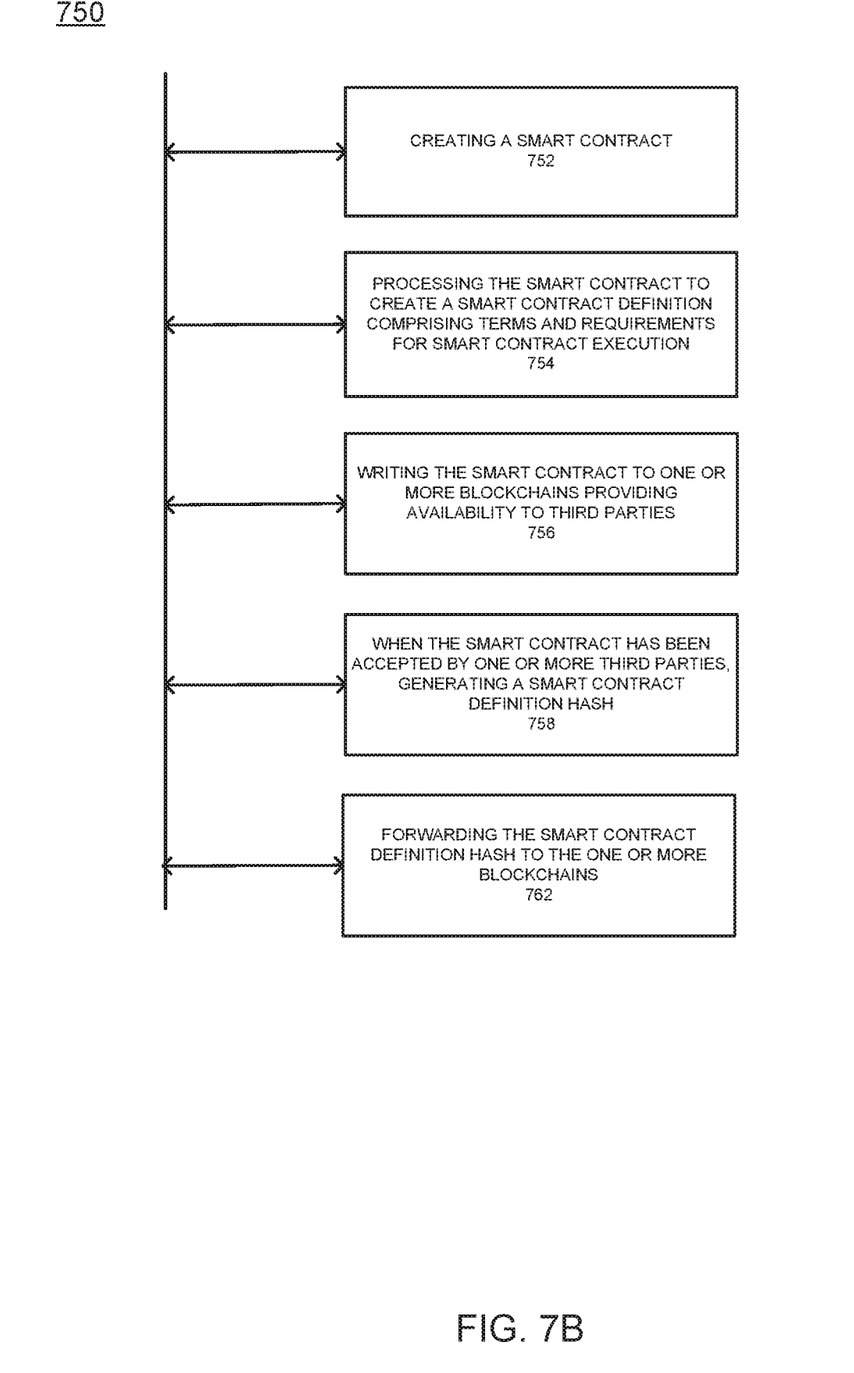
FIG. 7B illustrates another flow diagram of an example method of creating and writing smart contracts to a blockchain, according to example embodiments.

FIG. 7B illustrates another flow diagram of an example method of creating and writing smart contracts to a blockchain, according to example embodiments. Referring to FIG. 7B, the method 750 may include creating a smart contract 752, processing the smart contract to create a smart contract definition comprising terms and requirements for smart contract execution 754, writing the smart contract to one or more blockchains providing availability to third parties 756, when the smart contract has been accepted by one or more third parties, generating a smart contract definition hash 758, and forwarding the smart contract definition hash to the one or more blockchains 762.

In this example, instead of requiring contracting parties to agree and sign the terms of a smart contract, the smart contract may be setup as a proposed smart contract, which is then sent to blockchains for identification and advertisement to various third party candidates. The third party candidates may identify the terms of the smart contract, such as time, location, client type, price, commercial, residential or any other specified interest explicitly identified in the smart contract. Then purchasers or smart contract interested parties can then seek to engage in the smart contract and attempt to formalize a contractual deal through the smart contract.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
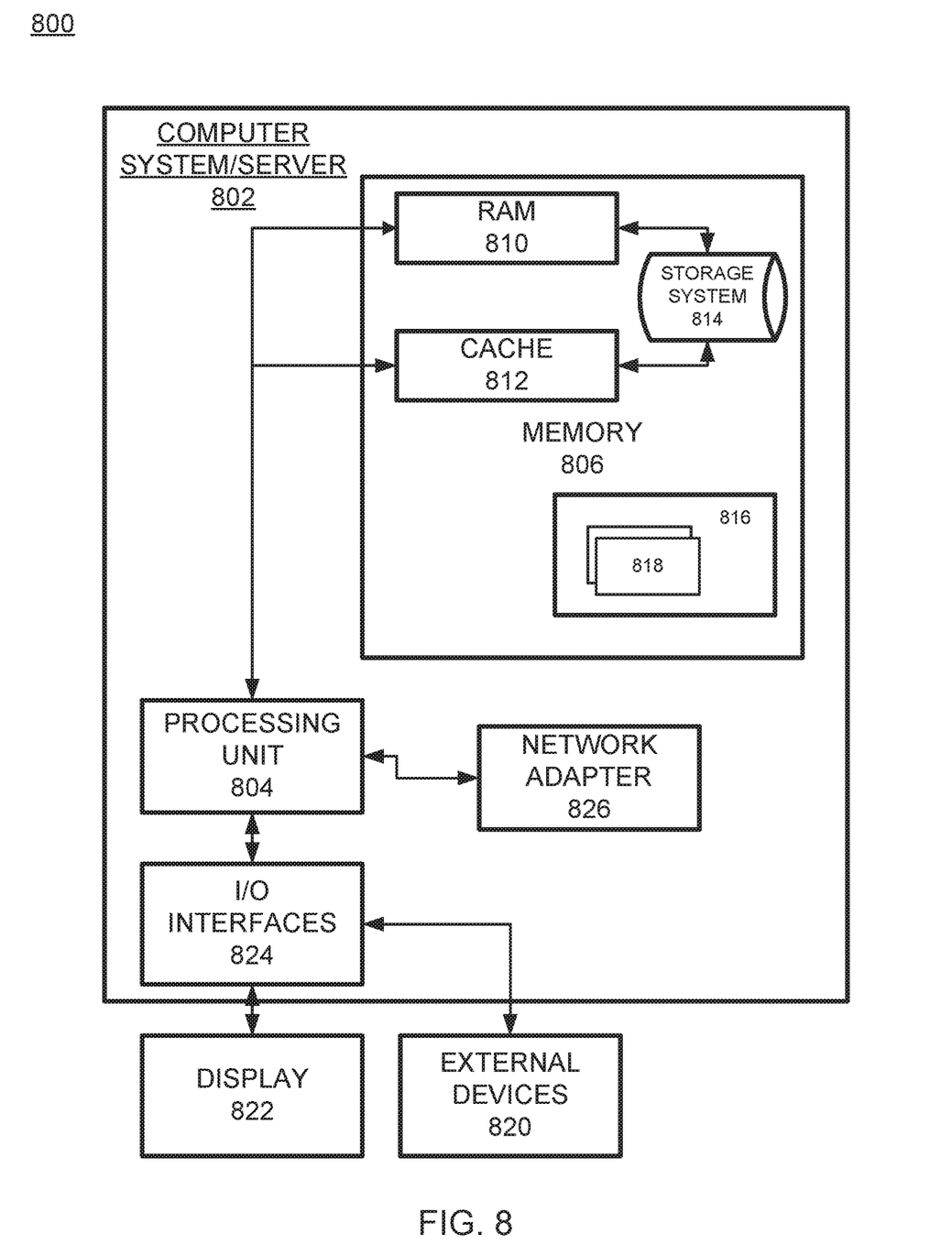
FIG. 8 illustrates an example computer system/server configured to support one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via the bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   identifying, by peers of a blockchain network, a smart contract, the smart contract being signed by parties to the smart contract prior to being enacted on by a blockchain of the blockchain network;
   creating, from terms parsed from the smart contract, a transition matrix identifying states of the smart contract and a variable representation a corresponding event for each state;
   creating, from the parsed terms, a contract alphabet indicating an event corresponding to each variable in the transition matrix;
   generating a hash of a smart contract definition based on the smart contract being accepted by the parties; and
   forwarding the hash of the smart contract definition to the blockchain.

2. The method of claim 1, further comprising:
   identifying that the blockchain is to be monitored for an updated event;
   identifying, form the smart contract, that an event on the blockchain is to be monitored;
   reading a new block on the blockchain;
   identifying the updated event from the new block; and
   executing a state transition of the transition matrix based on the updated event to execute the state transition of the transition matrix.

3. The method of claim 2, further comprising:
   identifying a party required to be notified of the updated event; and
   transmitting a notification of the updated event to the required party.

4. The method of claim 3, further comprising:
   identifying an external data source to monitor;

determining a policy to use when monitoring the event on the blockchain;

determining which of one or more blockchains to write the updated event; and when the policy has been satisfied, writing the updated event to the one or more blockchains.

5. The method of claim 4, wherein the policy requires a minimum number of external data sources to confirm the update event.

6. An apparatus in a blockchain network, the apparatus comprising:

a processor; and a memory configured to store one or more instructions that when executed by the processor cause the processor to:

identify a smart contract that is signed by parties to the smart contract prior to being enacted on by a blockchain of the blockchain network, create, from terms parsed from the smart contract, a transition matrix identifying states of the smart contract and a variable representing a corresponding event for each state, create, from the parsed terms, a contract alphabet indicating an event corresponding to each variable in the transition matrix, generate a hash of the transition matrix and of the contract alphabet based on the smart contract being accepted by the parties, forward the hash to the blockchain.

7. The apparatus of claim 6, wherein the processor is further configured to:

identify that the blockchain is to be monitored for an updated event;

identify, form the smart contract, that an event on the blockchain is to be monitored;

read a new block on the blockchain;

identify the updated event from the new block; and executing a state transition of the transition matrix based on the updated event to execute the state transition of the transition matrix.

8. The apparatus of claim 7, wherein the process is further configured to:

identify a party required to be notified of the updated event; and transmit a notification of the updated event to the required party.

9. The apparatus of claim 8, wherein the process is further configured to:

identify an external data source to monitor;

determine a policy to use when monitoring the event on the blockchain;

determine which of one or more blockchains to write the updated event; and when the policy has been satisfied, writing the updated event to the one or more blockchains.

10. The apparatus of claim 9, wherein the policy requires a minimum number of external data sources to confirm the update event.

11. A non-transitory computer readable storage medium configured to store one or more instructions that when executed by a processor cause the processor to perform:

identifying, by peers of a blockchain network, a smart contract, the smart contract being signed by parties to the smart contract prior to being enacted on by a blockchain of the blockchain network;

creating, from terms parsed from the smart contract, a transition matrix identifying states of the smart contract and a variable representation a corresponding event for each state;

creating, from the parsed terms, a contract alphabet indicating an event corresponding to each variable in the transition matrix;

generating a of the transition matrix and of the contract alphabet based on the smart contract being accepted by the parties; and forwarding the hash to the blockchain.

12. The non-transitory computer readable storage medium of claim 11, wherein the one or more instructions further cause the processor to perform:

identifying that the blockchain is to be monitored for an updated event;

identifying, form the smart contract, that an event on the blockchain is to be monitored;

reading a new block on the blockchain;

identifying the updated event from the new block; and executing a state transition of the transition matrix based on the updated event to execute the state transition of the transition matrix.

13. The non-transitory computer readable storage medium of claim 12, wherein the one or more instructions further cause the processor to perform:

identifying a party required to be notified of the updated event; and transmitting a notification of the updated event to the required party.

14. The non-transitory computer readable storage medium of claim 13, wherein the one or more instructions further cause the processor to perform:

identifying one or more external data sources to monitor;

determining a policy to use when monitoring the event on the blockchain;

determining which of one or more blockchains to write the updated event; and when the policy has been satisfied, writing the updated event to the one or more blockchains, and wherein the policy requires a minimum number of external data sources to confirm the updated event.

* * * * *